United States Patent
Namimatsu et al.

(10) Patent No.: US 7,169,854 B2
(45) Date of Patent: Jan. 30, 2007

(54) FLUORORESIN COMPOSITION, PROCESS FOR PREPARING THE SAME AND CABLE COATED WITH THE SAME

(75) Inventors: Masayuki Namimatsu, Settsu (JP); Yoshiyuki Hiraga, Settsu (JP); Yoshiyuki Takase, Settsu (JP); Tadahiro Yabu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 311 days.

(21) Appl. No.: 10/488,839

(22) PCT Filed: Sep. 10, 2002

(86) PCT No.: PCT/JP02/09216

§ 371 (c)(1),
(2), (4) Date: Mar. 8, 2004

(87) PCT Pub. No.: WO03/022922

PCT Pub. Date: Mar. 20, 2003

(65) Prior Publication Data

US 2004/0254300 A1  Dec. 16, 2004

(30) Foreign Application Priority Data

Sep. 11, 2001  (JP) ............... 2001-275686

(51) Int. Cl.
*C08L 27/18*  (2006.01)
(52) U.S. Cl. .............. 525/200; 524/544; 524/545; 524/500; 526/247; 525/337; 428/421
(58) Field of Classification Search .......... 524/500, 524/544, 545; 526/247; 525/337; 428/421
See application file for complete search history.

(56) References Cited

U.S. PATENT DOCUMENTS 4,029,868 A * 6/1977 Carlson ............... 526/247
4,425,448 A * 1/1984 Concannon et al. ...... 523/218
4,478,965 A * 10/1984 Concannon et al. ...... 523/218
5,041,500 A * 8/1991 Ishiwari et al. ......... 525/200
5,317,061 A * 5/1994 Chu et al. .............. 525/200
H001736 H * 6/1998 Legare et al. ........... 525/194

FOREIGN PATENT DOCUMENTS

| JP | 51-122156 A | 10/1976 |
|---|---|---|
| JP | 52-98761 A | 8/1977 |
| JP | 52-109588 A | 9/1977 |
| JP | 59-166516 A | 9/1984 |
| JP | 5-47221 A | 2/1993 |
| JP | 7-169334 A | 7/1995 |
| JP | 9-52920 A | 2/1997 |
| JP | 9-104772 A | 4/1997 |
| JP | 10-513497 A | 12/1998 |
| JP | 2000-198813 A | 7/2000 |

* cited by examiner

*Primary Examiner*—Ling-Sui Choi
*Assistant Examiner*—Henry S. Hu
(74) *Attorney, Agent, or Firm*—Sughrue Mion, PLLC

(57) ABSTRACT

The present invention provides a fluororesin composition, which is excellent in moldability and crack resistance, a process for preparing the composition and a cable evenly coated with the composition. Specifically, the present invention provides a fluororesin composition wherein polytetrafluoroethylene is compounded to a terpolymer comprising tetrafluoroethylene, hexafluoropropylene and perfluoroalkyl vinylether. Also, the present invention provides a process for preparing the composition which comprises kneading with a multi-screw kneader. Furthermore, the present invention provides a cable which is coated with the resin.

2 Claims, No Drawings

FLUORORESIN COMPOSITION, PROCESS FOR PREPARING THE SAME AND CABLE COATED WITH THE SAME

TECHNICAL FIELD

The present invention relates to a fluororesin composition, which is excellent in moldability and in which a melt processable terpolymer of tetrafluoroethylene/hexafluoropropylene/perfluoroalkyl vinylether and polytetrafluoroethylene are compounded, a process for preparing the same and a cable coated with the same.

BACKGROUND ART

A copolymer of tetrafluoroethylene (hereinafter referred to as TFE) and hexafluoropropylene (hereinafter referred to as HFP) (hereinafter referred to as FEP) has heat resistance, chemical resistance, electric insulating properties, non-adhesiveness and low frictional properties equal to those of polytetrafluoroethylene (hereinafter referred to as PTFE) and therefore is often applied not only in the chemical industry, electric and electronic industries and machine industry, but also in a wide range of fields, from space development and aircraft industry to household products. Furthermore, FEP has melt flowability and can be melt processed by compression molding, extrusion molding, injection molding and fluid immersion coating.

However, in comparison to general thermoplastic resin, FEP has an extremely high melt flow temperature and high melt viscosity and therefore, a molding temperature of 330° to 420° C., in some cases 440° C., is required. Molding at such high temperatures causes thermal decomposition of the polymer. Furthermore, when extrusion pressure is raised in order to increase the molding speed, surface roughness of the extruded article and abnormal flow (melt fracture) are caused.

In order to solve the above problems and improve moldability without losing properties, JP-A-52-98761 discloses a fluororesin composition, in which PTFE is compounded in FEP. As a result, phenomena such as surface roughness of the molded article and melt fracture are said to have difficulty occurring, but the effects are still insufficient. However, as FEP, only a binary copolymer of TFE/HFP has been considered and addition of a third component is not particularly limited.

Also, in recent years, FEP is used for cable coating material and the speed for molding may reach at least 1200 ft/minute and in some cases, 3000 ft/minute. This speed is within the melt fracture range of FEP. Consequently, the coated cable is large in wire diameter unevenness and electric properties such as insulation become uneven.

Furthermore, in order to improve electric properties, an electric wire can be coated with resin in a foamed state. However, to obtain stable electric properties, the resin must be in a foamed state of even bubbles with a small bubble diameter.

DISCLOSURE OF INVENTION

The present invention solves the above problems and provides a fluororesin composition, which is excellent in moldability and crack resistance, a process for preparing the composition and a cable coated with the composition.

That is, the present invention relates to a fluororesin composition wherein polytetrafluoroethylene is compounded to a terpolymer comprising tetrafluoroethylene, hexafluoropropylene and perfluoroalkyl vinylether.

The content of the polytetrafluoroethylene is preferably 0.03 to 2 parts by weight based on 100 parts of the terpolymer.

The terpolymer preferably comprises 67 to 89.5% by weight of tetrafluoroethylene, 10 to 20% by weight of hexafluoropropylene and 0.5 to 13% by weight of perfluoroalkyl vinylether.

The present invention also relates to a process for preparing a fluororesin composition which comprises kneading a terpolymer comprising tetrafluoroethylene, hexafluoropropylene and perfluoroalkyl vinylether with polytetrafluoroethylene by using a multi-screw kneader.

The multi-screw kneader is preferably a twin-screw extruder.

The multi-screw kneader preferably has at least one kneading block.

Kneading is preferably conducted while adding water.

Kneading is preferably conducted while adding a gas containing oxygen.

The terpolymer and polytetrafluoroethylene are preferably pre-mixed.

The present invention also relates to a cable having a core wire coated with the fluororesin composition.

The core wire preferably comprises metal.

The metal is preferably copper.

The present invention also relates to a cable having a core wire coated with the fluororesin composition, which is foamed by inert gas.

The inert gas is preferably carbon dioxide or nitrogen.

The core wire preferably comprises metal.

The metal is preferably copper.

BEST MODE FOR CARRYING OUT THE INVENTION

The terpolymer used in the present invention comprises TFE, HFP and perfluoroalkyl vinylether. By adding perfluoroalkyl vinylether as a copolymer component, moldability and crack resistance tend to improve. Examples of the perfluoroalkyl vinylether are vinylether represented by the formula:

(wherein m is an integer of 1 to 6)(perfluoromethyl vinylether (hereinafter referred to as PMVE) when m is 1) and vinylether represented by the formula:

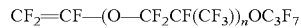

(wherein n is an integer of 1 to 4). When n is 1 to 2, heat resistance is poor as the melting point becomes low and when n is 4, production costs tend to increase. Therefore, perfluoropropyl vinylether in which n=3 (hereinafter referred to as C3VE) is preferable. The composition ratio thereof is preferably 67 to 89.5% by weight of TFE, 10 to 20% by weight of HFP and 0.5 to 13% by weight of perfluoroalkyl vinylether based on the weight of the terpolymer. More preferably, TFE is 83 to 89.3% by weight, HFP is 10 to 15% by weight and perfluoroalkyl vinylether is 0.7 to 2.0% by weight. When TFE is less than 67% by weight, heat resistance tends to become extremely poor. When TFE is more than 89.5% by weight, moldability becomes poor as the melting point becomes high and crack resistance tends to become poor. When HFP is less than 10% by weight, crack resistance tends to become poor. When HFP is more than 20% by weight, moldability becomes poor as the melting point becomes low and heat resistance and productivity tend to become poor. When perfluoroalkyl vinylether is less than 0.5% by weight, the effect of copolymerizing perfluoroalkyl vinylether tends not to appear. When perfluoroalkyl vinylether is more than 13% by weight, the viscosity becomes low and moldability tends to become poor. The terpolymer may also contain a small amount of a fourth component, a modifying agent or a filler.

The method for copolymerization is not particularly limited and examples are suspension polymerization and emulsion polymerization.

The content of PTFE compounded with the terpolymer is preferably 0.03 to 2 parts by weight based on 100 parts by weight of the terpolymer. More preferably, the lower limit is 0.05 part by weight and the upper limit is 0.5 part by weight. When the content of PTFE is less than 0.03 part by weight, the effect of adding PTFE tends not to appear. When the amount is more than 2 parts by weight, the melt viscosity increases significantly and the molded article tends to become brittle.

PTFE preferably has a molecular weight of at least 1,000,000, more preferably at least 3,000,000. When the molecular weight is less than 1,000,000, the molded article tends to be poor in crack resistance. PTFE is a homopolymer of TFE or a copolymer of TFE and hexafluoropropylene, or a copolymer of tetrafluoroethylene and trichlorofluoroethylene and the like. In the case that PTFE is compounded as powder, the particle size is preferably at most 1,000 μm, more preferably at most 800 μm. When the particle size of PTFE is more than 1,000 μm, dispersability with the copolymer tends to be inhomogeneous. The form of PTFE is not limited and can be powder, a dispersion or a suspension.

The terpolymer and PTFE used in the present invention are kneaded by a multi-screw kneader. It is important that the PTFE is sufficiently dispersed. When dispersion is insufficient, PTFE with high molecular weight aggregates when molding. For example, when a mixture of the copolymer and PTFE containing PTFE aggregate is used as coating material for a cable, the surface of the cable becomes uneven due to the PTFE aggregate, adversely affecting electric properties. However, as mentioned above, because the amount of PTFE is an extremely small amount of preferably 0.03 to 2 parts by weight, homogeneously dispersing is difficult. Therefore, a twin-screw extruder, which is particularly excellent in kneading function, is preferably used. More preferably, a multi-screw kneader having at least one kneading block is used. The number of kneading blocks can be determined according to the functions of the kneader. The kneading block can further improve the degree of dispersion of PTFE. Preferably, from the viewpoint of advancing kneading, as many kneading blocks as possible are installed within the range that the copolymer and PTFE are not damaged.

Kneading by the multi-screw kneader is preferably conducted while adding water or air. Usually, water and air introduced into the extruder are removed by forming a vent hole in a cylinder and connecting a vacuum pump to the vent hole. However, by adding water or oxygen to the resin, the unstable terminal groups present in the fluororesin composition of the present invention can be stabilized. The unstable terminal groups are thought to cause air bubbles, voids and coloring in the molded article of the fluororesin composition.

Water stabilizes carboxylic acid terminal groups and converts acid fluoride into carboxylic acid. The amount of water added must be an amount excessive of the theoretical amount required for the reaction. The amount is largely influenced by the pressure when adding and the state within the extruder and is determined while checking with an actual machine. The reaction for stabilizing carboxylic acid terminal groups is significantly advanced by adding a reaction accelerating agent such as an alkali metal compound and so water is preferably added as an aqueous solution in which an accelerating agent is dissolved. The concentration of the aqueous solution can be determined accordingly based on the necessary amount of the accelerating agent. As long as water is present in the kneader within the area in which stabilization treatment is conducted (hereinafter referred to as stabilization treatment area), the fluorine-containing polymer may be moistened to contain water before being added into the kneader or water may be supplied after adding the dried polymer into the kneader. Stabilization can theoretically be conducted if the amount of water supplied has the same number of molecules as the number of unstable terminal groups which develop in the kneader. However, in reality, an excessive amount of water, particularly water with at least 10 times the number of molecules of the number of unstable terminal groups, is preferably supplied. The upper limit is not particularly defined.

Oxygen converts vinyl terminal groups into acid fluoride terminal groups. Furthermore, the function of oxidizing the few carbon atoms produced in depolymerization of the vinyl terminal groups to produce carbon dioxide can be obtained.

The amount of oxygen ($O_2$) present differs depending on the temperature at the reaction, the residence time in the stabilization treatment area, the type of extruder and the type and amount of unstable terminal groups. The amount is at least an amount equimolar to the amount of unstable terminal groups ($-CF=CF_2$), which need to be stabilized. When considering diffusion loss and the amount discharged without contributing to the reaction, the amount is preferably an excess amount, for example at least 10 times the molar amount, particularly 50 to 500 times the molar amount.

As the gas containing oxygen, oxygen can be diluted to a suitable concentration (for example 10 to 30% by volume) with inert gas such as nitrogen gas and argon gas and then supplied but preferably air is used as it is, from an economical viewpoint.

As long as oxygen is present in the stabilization treatment area, oxygen may be contained in the fluorine-containing polymer before being added into the kneader or oxygen may be supplied after the fluorine-containing polymer is added into the kneader. Naturally, both methods may be used together.

Also, kneading while simultaneously supplying water and oxygen (air) is preferable.

Usually, unless special measures are taken, the polymer supplied into the kneader contains air and water equal to atmospheric air. However, with an amount of oxygen and water of this level, the stabilization effect which the present invention has achieved cannot be obtained. The reason is considered to be because low molecular weight substances and various additives in the polymer (such as a polymerization initiator) are decomposed in the stabilization treatment area of the kneader, generating gas, and as a result, the partial pressure of oxygen in the stabilization treatment area is decreased and contact of the polymer and oxygen becomes insufficient. Herein, the stabilization treatment area can be located, for example, at the screw part immediately after the melting zone formed by the kneading block of the twin-screw extruder. Also, modifications are possible, such as forming a long melting zone and the stabilization treatment area further downstream.

The treatment time, that is the residence time, in the stabilization treatment area differs depending on the structure of the kneader, the supply method of water and air and the treatment temperature in the stabilization treatment area. Usually, less than 10 minutes is sufficient and 0.2 to 5 minutes is preferable. When the residence time becomes long, large shearing force is applied and the polymer tends to become damaged.

The temperature of the stabilization treatment area is usually 200° to 450° C., preferably 300° to 400° C.

In the present invention, gaseous substances produced in the stabilization treatment reaction, such as hydrogen fluoride, carbon dioxide and small amounts of monomers produced by decomposition, are drawn out from within the stabilized fluorine-containing polymer and discharged from the kneader. Therefore, a degassing area, in which the absolute pressure is maintained at 0.1 MPa or lower, is preferably located in the kneader successively to the stabilization treatment area. The absolute pressure in the degassing area differs depending on the melted state of the polymer and operation conditions such as the rotational speed of the extruder screw. The pressure is preferably reduced to a degree at which the polymer does not enter into the discharge nozzle.

The fluorine-containing polymer obtained by stabilization treatment and discharged from the kneader of the present invention usually has the shape of a pellet. When the pellet is used in melt molding, air bubbles and voids do not develop and coloring does not occur in the obtained molded article.

When necessary, the kneaded object (pellet) retrieved from the kneader can be subjected to the above fluorination treatment.

Before kneading in a multi-screw extruder, the terpolymer and PTFE are preferably pre-mixed, thereby further improving the degree of dispersion of PTFE. The powder mixer used for pre-mixing is not particularly limited and examples are a mixer, a mixing roll, a kneader, a ball mill, a banbury mixer and a blender. The pre-mixing method can be a wet method or a dry method. Furthermore, the terpolymer and PTFE can be added to the reaction system before or during the polymerization reaction of the copolymer to be pre-mixed.

The cable of the present invention is coated with the fluororesin composition of the present invention, in which the terpolymer and PTFE are compounded. Because the fluororesin composition has low melt viscosity, preferably melt flow rate (hereinafter referred to as MFR) measured according to ASTM D-2116 of at least 15 at 372° C., even when molded at high speed, the wire diameter becomes even. As a result, a cable which is excellent in electric properties such as insulation can be obtained. More preferably, the MFR at 372° C. is at least 17.5.

An example of the cable is a LAN cable used for constructing a local area network (LAN) of personal computers. A LAN cable is used inside an office and therefore is required to have high flame retardancy. The fluororesin composition comprising the above terpolymer can fulfill this requirement. The thickness of the resin composition coating of the cable can be determined according to the use.

The core wire of the cable is preferably metal. Particularly, copper is preferable.

Coating the cable with the fluororesin composition in a foamed state can be achieved by adding inert gas into the extruder when molding the electric wire. Inert gas dissolves relatively well in the FEP part, which has amorphous parts, and becomes bubbles when discharged from the die of the electric wire molding machine. The growth of the bubbles seems to stop due to the crystalline parts of the added PTFE and relatively small bubbles can be produced. The inert gas is not particularly limited as long as it is a gas which does not react with resin and from the viewpoints that availability and low cost, carbon dioxide or nitrogen is preferable.

Hereinafter, specific Examples are described for explanation of the present invention, but the present invention is not limited thereto.

Measurement Method (Lamp)

Detection was conducted of parts in which the resin coating thickness was (preset diameter+20 mil) by a lamp detector (made by Zumback, KW32 TRIO).

(Spark)

Detection was conducted of parts which were not coated with resin by a spark tester charged to 1.83 kV (made by CLINTON INSTRUMENT COMPANY, Model HF-20-H).

(Cone Break)

Cone break was considered to occur when both the lamp detector and spark tester were simultaneously set off and continuing the test was temporarily not possible as the cone part was visually found to have broken.

(External Diameter Stability)

The external diameter was measured by an external diameter measuring instrument (made by Zumback, ODAC 16XY) and found from the equation: (upper limit of external diameter—lower limit of external diameter)/6σ (σ: standard deviation of external diameter; hereinafter, the value found from the equation is referred to as Cp). The larger the Cp value, the more stable the external diameter. Also, the Cp value is preferably at least 1.5.

(Measurement of Melt Flow Rate (MFR))

Melt flow rate was measured according to ASTM D-2116 by the method of 372° C. and 5 kg load.

EXAMPLE 1

100 parts by weight of FEP powder obtained by emulsion polymerizing TFE/HFP/C3VE in an amount of 87.2/11.7/1.1 (weight ratio) with ammonium persulfate (APS) as a polymerization initiator and 0.1 part by weight of PTFE fine powder (average particle size 450 μm, number average molecular weight 5,000,000) were pre-mixed for 30 minutes by a powder mixer equipped with a stirrer and kneading block.

The above powder (containing air) to which special pre-drying treatment was not conducted except that potassium carbonate was added so as to become 20 ppm (value converted to amount of potassium, equal to 4.3% of the total number of unstable terminal groups) was supplied at a speed of 50 kg/hour into a twin-screw extruder made by Japan Steel Works, Ltd. (screw shaft diameter: 47 mm, total length: 2468 mm, number of barrels: 15 (first barrel: raw material supplying area, second to fifth barrels: melting area, sixth to twelfth barrels: kneading and reacting area, thirteenth to fifteenth barrels: degassing area)). At an area further downstream from the powder supply port, deionized water and air (oxygen concentration approximately 20%) were supplied into the stabilization treatment area (kneading block area) at a flow rate of 1.5 kg/hour and 40 NL/minute respectively. The preset temperature of the stabilization treatment area was 350° C. and the absolute pressure was 0.6 MPa and the total time required for the all treatment including the time for melting by heating was 5 minutes (the residence time in the stabilization treatment area was presumed to be approximately 2 minutes). In this way, the fluororesin composition of the present invention in the form of pellets was obtained. The MFR of the fluororesin composition was 24.1 at 372° C.

The obtained pellets were coated on a copper wire with a diameter of 20.1 mil by a 2-inch single screw extruder and the cable of the present invention with a diameter of 35.5 mil was obtained. The coating speed was 1600 to 2400 ft/minute. In the extruder for coating an electric wire, the temperature was controlled in 5 zones in the main body and in 4 zones in the die. From the raw material supply side, each temperature was controlled to Main body: 327° C., 371° C., 388° C., 399° C., 416° C.
Die: 427° C., 427° C., 427° C., 427° C.

The coated cable was cooled by passing through an air-cooling zone and a water-cooling zone.

The results of the above measurement methods are shown in Table 1.

COMPARATIVE EXAMPLE 1

The fluororesin composition (MFR at 372° C.: 24.1) was obtained by the same method as in Example 1, except that PTFE fine powder was not used, and was coated on a copper wire.

The results of the above measurement methods are shown in Table 1.

COMPARATIVE EXAMPLE 2

The fluororesin composition (MFR at 372° C.: 23) was obtained by the same method as in Example 1, except that 100 parts by weight of FEP powder obtained by emulsion polymerizing TFE/HFP in an amount of 86/14 (weight ratio) with ammonium persulfate (APS) as a polymerization initiator and 0.15 part by weight of PTFE fine powder (average particle size 450 μm, number average molecular weight 5,000,000) were pre-mixed for 30 minutes by a powder mixer equipped with a stirrer. Coating of a copper wire was attempted, but could not be conducted as cone break occurred even at a coating speed of 1600 ft/minute.

TABLE 1

|  |  | Ex. 1 | Com. Ex. 1 |
|---|---|---|---|
| Lamp (quantity/$10^{\times 4}$ feet) | 1600 ft/minute | 0 | 0 |
|  | 2000 ft/minute | 0 | 9.5 |
|  | 2400 ft/minute | 0 | 3.8 |
| Cone Break (times/$10^{\times 4}$ feet) | 1600 ft/minute | 0 | 1.5 |
|  | 2000 ft/minute | 0 | 0 |
|  | 2400 ft/minute | 0 | 18.9 |
| Spark (quantity/$10^{\times 4}$ feet) | 1600 ft/minute | 6.2 | 16.1 |
|  | 2000 ft/minute | 16.7 | 4.7 |
|  | 2400 ft/minute | 9.2 | 68 |
| External Diameter Stability Cp (upper limit of external diameter − lower limit)/6σ | 1600 ft/minute | 1.1 | 2.1 |
|  | 2000 ft/minute | 2 | 1.5 |
|  | 2400 ft/minute | 1.6 | 0.7 |

INDUSTRIAL APPLICABILITY

According to the present invention, a fluroresin composition, which is melt processable and excellent in moldability and crack resistance, can be obtained. Also, a cable evenly coated therewith can be obtained.

The invention claimed is:

1. A fluororesin composition wherein polytetrafluoroethylene is compounded to a terpolymer comprising tetrafluoroethylene, hexafluoropropylene and perfluoroalkyl vinylether, wherein the content of said polytetrafluoroethylene is 0.03 to 2 parts by weight based on 100 parts of said terpolymer.

2. The fluororesin composition of claim 1, wherein said terpolymer comprises 67 to 89.5% by weight of tetrafluoroethylene, 10 to 20% by weight of hexafluoropropylene and 0.5 to 13% by weight of perfluoroalkyl vinylether.

* * * * *